July 22, 1952
B. S. McCUTCHEN ET AL
2,604,620
RADIO NAVIGATION SYSTEM
Filed Oct. 4, 1946
2 SHEETS—SHEET 1
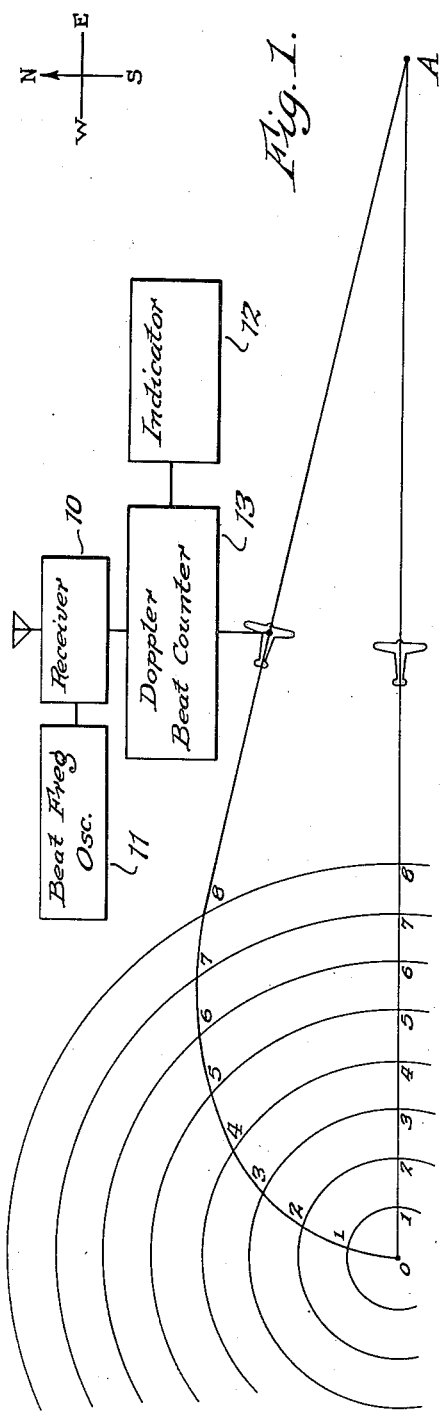
INVENTORS.
Brunson S. McCutchen and
Charles W. McCutchen
BY C. A. Norton
Attorney July 22, 1952  B. S. McCUTCHEN ET AL  2,604,620
RADIO NAVIGATION SYSTEM
Filed Oct. 4, 1946  2 SHEETS—SHEET 2
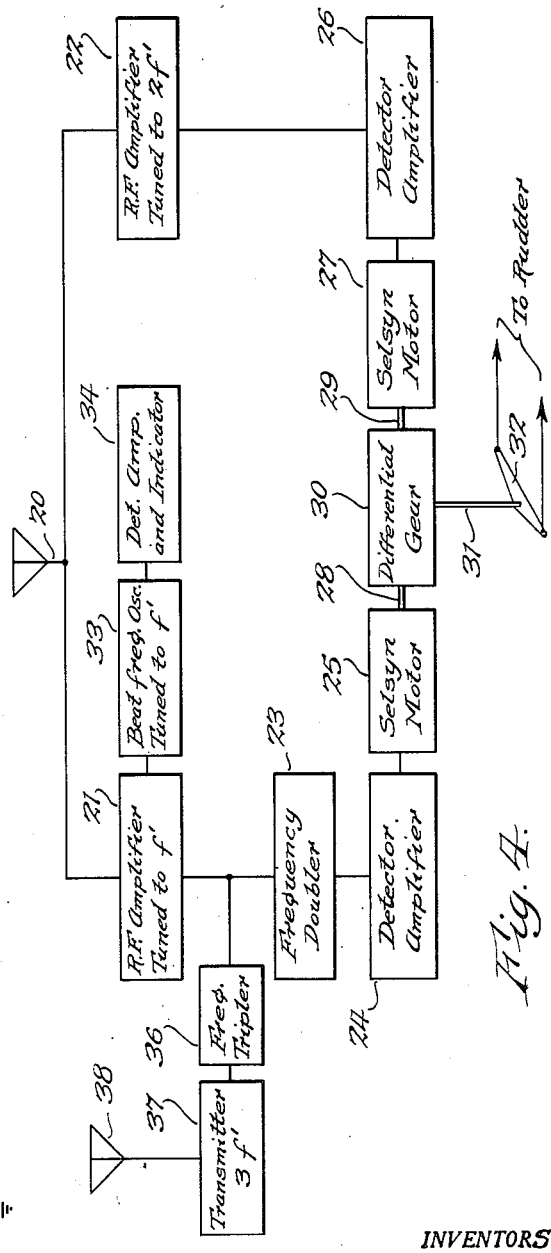
INVENTORS.
Brunson S. McCutchen and
Charles W. McCutchen
BY C. A. Norton
Attorney Patented July 22, 1952

2,604,620

UNITED STATES PATENT OFFICE 2,604,620

RADIO NAVIGATION SYSTEM

Brunson S. McCutchen and Charles W. McCutchen, Princeton, N. J.

Application October 4, 1946, Serial No. 701,358

7 Claims. (Cl. 343—5)

This invention relates to new and useful improvements in the art of radio navigation and control of vehicles, particularly airplanes, boats, guided missiles, and the like.

It is an object of this invention to provide improved means to enable the pilot of an airplane or boat to keep his vehicle operating on a fixed course and to know how far he has traveled with respect to fixed reference points.

It is a further object of this invention to provide a system of the class described in which the results are accomplished without the radiation of any signals from the vehicle.

It is a further object of this invention to provide such a system which is automatic, relieving the pilot from certain duties and leaving him free to concentrate on others not connected with the navigation of the vehicle, and to render the system applicable to pilotless or "drone" planes, boats, and guided missiles.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which Figs. 1 and 2 are charts explaining the principles of our invention, Fig. 3 illustrates diagrammatically one form of apparatus in accordance with our invention, and Fig. 4 is a block diagram of still another embodiment of our invention.

Referring now more particularly to Fig. 1, suppose a radio transmitter radiating energy at a constant frequency $f$ is located at point O. An airplane, boat, or the like equipped with a receiver 10, having output indicator 12, which in the simplest form many be phones, and which has an oscillator 11 operating at the same frequency $f$, is assumed to be moving away from point O along line O—A. As the plane moves, frequency $f'$ of the signal received by the airplane receiver from the transmitter at O will be lower than frequency $f$ at which the oscillator in the airplane is operating, due to the well-known Doppler effect, and beats will be produced between the local and received oscillations. As will be understood, the velocity of transmission of the radio waves remains constant, the frequency goes down from what it would be if the plane were stationary, and the wave length increases.

If, on the other hand, the plane reverses its direction and flies back toward point O—A, the frequency $f'$ of the received signal as observed in the airplane will increase above $f$ and the wave length will decrease, and beats will again be produced between the received and locally generated oscillations. If the pilot flies in a circle around point O, the frequencies of local and received oscillations are the same, and no beats occur. The circles marked 1, 2, 3, etc., in Fig. 1 represent wave length from point O as the center, and every time the plane crosses one of these circles, moving toward or from the center, the received signal will increase or drop one cycle respectively.

It will be understood that this is not a discontinuous effect in abrupt steps, but is smooth and gradual. If the receiver is equipped with counter 13 which adds up the number of cycles dropped or added, the reading of the counter will be an accurate measure of the distance the plane has moved along line O—A. From this it follows that if the number of cycles dropped in a given time interval is measured, the speed of the plane with reference to point O will be known.

Should the plane follow a curved path from O to A, the counter will record the distance the plane is from point A and the speed with reference to point A may be computed, but this will not give any information as to whether the course was a straight line or curved.

A pilot employing a system such as described would require additional information to determine a "fix." For example, if he were following a radio beam of the "A—N" type and knew from the system already described how many miles he had traveled on such a course, he would know his exact location, whereas a pilot following the "A—N" beam, but not equipped with this system, would be unable to determine his location except by the use of additional equipment or by passing over the cone of silence at a known point.

Referring now to Fig. 2, this figure shows how the principles of Fig. 1 may be employed to furnish the pilot information as to whether he is on or off course. Suppose in this case transmitters are located at points $x$ and $y$, the distances O to $x$ and O to $y$ being equal and line $x$—$y$ being perpendicular to line O—A.

If, now, the plane flies along line O—A and if the transmitters at $x$ and $y$ are radiating the same frequency, a receiver in the plane will detect no beats between the two signals. This is because the distance from the plane to both $x$ and $y$ will be changing at the same rate, and although the frequencies received from the two transmitters will be changing, they will be changing identically and both frequencies will remain equal.

However, should the plane deviate from its course along O—A, the frequencies will no longer change at the same rate, and beats may be detected between the two incoming frequencies by means either audible or visual, both of which are well known in the art. For example, headphones or an oscilloscope may be used.

While the system thus far explained will tell the pilot that he has gone off course, it will not tell him in which direction he has gone off course. He can, however, determine this by applying a correction and noticing whether, after the correction, the beat frequency increases or decreases. If it increases, he will then know that his correction has taken him still farther off course, while if it decreases, he is applying it in the proper direction to get back on course.

Referring now to Fig. 3, we have shown diagrammatically one embodiment of our invention in which the pilot can determine from the indication itself, and without applying any correction, which way he is off course. In this embodiment transmitters $x$ and $y$, which are still operating at identical frequencies, are not operated simultaneously, but follow each other in sequence with a silent interval between each cycle; thus $x$ on for a period, then off; then $y$ on for a period, then off; both off for a period; $x$ on, etc.

Receiver 10 in the airplane may be a T. R. F. receiver, and is provided with beat frequency oscillator 11, which is adjusted to develop a convenient low tone frequency when beating with a signal from either $x$ or $y$, and which may be detected, amplified, and heard in indicator 12, which may be telephone receivers.

As long as the plane is on course, this tone frequency will not vary as signals from transmitters $x$ and $y$ are received successively, but if the plane goes off course, for instance to the north, the beat frequency of the signal from transmitter $x$ will increase while that from $y$ will decrease. Conversely, if it goes off to the south, the beat frequency from $x$ will decrease while that from $y$ will increase.

The pilot, knowing that the signal from transmitter $x$ follows the silent space and is then followed by the signal from $y$, can determine which way he has gone off course and can apply the proper correction to resume course.

Turning now to Fig. 4, we have shown still another embodiment of our invention which is particularly adapted to the control of pilotless vehicles or guided missiles. This embodiment makes use of the principles already described. In this instance the transmission from station $y$ is at twice the frequency of the transmission from $x$ and the receiver in the plane receives signals from both $x$ and $y$ on antenna 20.

The receiver in the vehicle or missile derives incoming signals from antenna 20, which picks up signals from both $x$ and $y$. Incoming signals are fed to the two radio frequency amplifiers 21 and 22 respectively, 21 tuned to frequency $f'$ as received from station $x$, and 22 tuned to frequency $2f'$ as received from station $y$.

The output of amplifier 21 is then supplied to frequency doubler 23 which converts incoming frequency $f'$ into frequency $2f'$. The output of frequency doubler 23 may then be supplied to detector-amplifier 24 and the output of detector-amplifier 24 supplied to selsyn motor 25. The output of radio amplifier 22 tuned to $2f'$ may then be supplied to detector-amplifier 26 and the output of this detector-amplifier fed to selsyn motor 27.

These motors drive shafts 28 and 29 respectively, operating differential gear 30, driving output shaft 31 connected to the rudder controls diagrammatically indicated at 32. In addition, the output of radio frequency amplifier 21 may be supplied to beat frequency oscillator 33 tuned to beat with frequency $f'$ at a suitable audio rate, and to detector-amplifier and indicator 34.

Selsyn motors 25 and 27 are connected to rotate shafts 28 and 29 in opposite directions in the well-known manner of differentiation gears and as long as shafts 28 and 29 rotate at the same speed, shaft 31 will not be rotated at all, but should shafts 28 and 29 rotate at different speeds, shaft 31 will rotate in one direction or the other, depending on which selsyn motor is operating faster.

As long as the vehicle or projectile remains on course, frequency $f'$, that is, the frequency received from transmitter $x$, will be exactly half of frequency $2f'$, that is, the signal received from transmitter $y$, and because $f'$ is doubled in frequency doubler 23, selsyn motors 25 and 27 will rotate at the same speed and rudder control shaft 31 will not rotate.

However, should the plane go off course by turning too far north for example, the Doppler effects will no longer balance, frequency $f'$ as doubled in frequency doubler 23 will no longer equal $2f'$, the speed of the selsyn motors will differ, and shaft 31 will rotate. It will be understood that the connection of shaft 31 to the rudder control is such that a deviation of the vehicle or missile off course to the north moves the rudder in a sense to apply a south correction.

If it is desired to be able to plot the course of the craft or missile from a fixed point, such as a ground station, the output of radio frequency amplifier 21 may be passed through frequency tripler 36 to transmitter 37 and radiated from antenna 38. The signal so transmitted may be received, for example, at point $x$, and the Doppler beats counted as compared with frequency $f$ in the manner described in connection with Fig. 1, except that allowance must be made for the double Doppler effect involved because of the round trip transmission, as well as for the tripling of frequency on the return trip.

When such factors are allowed for, the Doppler beats can be used to determine the position of the vehicle or missile.

At this point it will be noted that in dealing with the Doppler effect as applied to the transmission of radio waves the speed of radio waves is so high compared with the speed of any plane or projectile that the well-known Doppler mathematics as developed for sound can be considerably simplified, and it makes no difference whether the source or observer is doing the moving.

As an example, the method discussed herein works equally well for determining the location of the vehicle or missile whether the transmitter is on the plane and the receiving oscillator and counter are at the fixed point or vice versa, although in time of war when such vehicles should maintain radio silence, it will be preferable to radiate the signals from a ground base.

The system not only enables the vehicle or missile to fly a straight course as controlled by transmitters $x$ and $y$, but equally permits change of course in travel. This may be done by changing either the location or frequency of transmitter $x$ or $y$. Changing the location of one of the transmitters will cause the vehicle or projectile to change course and to fly straight away from point O in the new direction. If the frequency of one of the transmitters is changed, the vehicle or missile will follow a curved course which can be predicted and charted for any particular frequency change.

In the specification we have explained the principles of our invention and the best mode in which we have contemplated applying those principles, so as to distinguish our invention from other inventions; and we have particularly pointed out and distinctly claimed the part, improvement, or combination which we claim as our invention or discovery.

While we have shown and described certain preferred embodiments of our invention, it will be understood that modifications and changes may be made without departing from the spirit and scope thereof, as will be clear to those skilled in the art.

We claim:

1. In a system for radio navigation of a moving object with reference to a pair of fixed objects, a pair of transmitters each located at one of said fixed objects and arranged to transmit signals, the frequency of one of which is twice that of the other, a receiver at the moving object comprising means for separating received signals, means for doubling the frequency of the lower frequency received signal, means for producing rotary motions, each proportional to the frequency of a received signal, means for combining said rotary motions differentially, and means for controlling the steering from such combined motions in a sense to correct deviations from a predetermined course.

2. In a system for radio navigation of a moving object with reference to a pair of fixed objects, a pair of transmitters each located at one of said fixed objects and arranged to transmit signals, the frequency of one of which is twice that of the other, a receiver at the moving object comprising means for separating received signals, means for doubling the frequency of the lower frequency received signal, means for producing rotary motions, each proportional to the frequency of a received signal, means for combining said rotary motions differentially, means for multiplying the frequency of the lower frequency received signals by a digit larger than two, and means for transmitting signals at the last mentioned multiplied frequency.

3. In a system for radio navigation of a moving object with reference to a pair of fixed objects, a pair of transmitters each located at one of said fixed objects and arranged to transmit signals, the frequency of one of which is a multiple of the other, a receiver at the moving object comprising means for separating received signals, means for multiplying by the said multiple the frequency of the lower frequency received signal, means for producing rotary motions, each proportional to the frequency of a received signal, means for combining said rotary motions differentially, and means for controlling the steering from such combined motions in a sense to correct deviations from a predetermined course.

4. In a system for radio navigation of a moving object with reference to a pair of fixed objects, a pair of transmitters each located at one of said fixed objects and arranged to transmit signals, the frequency of one of which is twice that of the other, a receiver at the moving object comprising means for separating received signals, means for doubling the frequency of the lower frequency received signal, means for producing rotary motions, each proportional to the frequency of a received signal, means for combining said rotary motions differentially, means for tripling the frequency of the lower frequency received signal, and means for transmitting signals at the last mentioned multiplied frequency.

5. In a system for radio navigation of a moving object with reference to a pair of fixed objects, a pair of transmitters located at one of said fixed objects and arranged to transmit signals, the frequency of one of which is twice that of the other, a receiver at the moving object comprising means for separating received signals, means for doubling the frequency of the lower frequency received signal, a pair of selsyn motors operated at speeds proportional to the frequency of the incoming signals, a steering control, and a differential mechanism for applying to said steering control the resultant of the differential input, in a sense to correct for deviations from predetermined course.

6. In radio navigational apparatus for operation of a moving object in response to a plurality of incoming radio signals, the transmitted frequency of one of which is double that of the other, in combination, a receiver on said moving object, means for separating incoming signals, means for doubling the frequency of the lower frequency incoming signal, means for producing motions, each proportional to the frequency of incoming signals, means for combining the said motions differentially, a steering control, and means for applying the resultant motion to said steering control.

7. The combination claimed in claim 2 with means located at a fixed point for receiving the last mentioned multiplied frequency signals, means for producing beats between the frequency transmitted from the fixed objects and the last mentioned multiplied frequency signals, and means for determining from said beats the position of the moving object.

BRUNSON S. McCUTCHEN.
CHARLES W. McCUTCHEN.

REFERENCES CITED

The following references are of record in the file of this patent:

UNITED STATES PATENTS

| Number | Name | Date |
|---|---|---|
| 1,495,616 | Simpson | May 27, 1924 |
| 1,639,667 | Ranger | Aug. 23, 1927 |
| 1,750,668 | Green | Mar. 18, 1930 |
| 1,907,471 | Alexanderson | May 9, 1933 |
| 1,981,884 | Taylor | Nov. 27, 1934 |
| 1,995,285 | Albersheim | Mar. 26, 1935 |
| 2,003,240 | Brockstedt | May 28, 1935 |
| 2,109,475 | Fanning | Mar. 1, 1938 |
| 2,144,203 | Shanklin | Jan. 17, 1939 |
| 2,198,113 | Holmes | Apr. 23, 1940 |
| 2,408,773 | Goodall | Oct. 8, 1946 |

FOREIGN PATENTS

| Number | Country | Date |
|---|---|---|
| 546,000 | Germany | Mar. 8, 1932 |